United States Patent
Takada et al.

(10) Patent No.: US 10,413,988 B2
(45) Date of Patent: Sep. 17, 2019

(54) ARC WELDING CONTROL METHOD

(71) Applicant: DAIHEN CORPORATION, Osaka (JP)

(72) Inventors: Kento Takada, Osaka (JP); Toshiaki Nakamata, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 174 days.

(21) Appl. No.: 15/518,644

(22) PCT Filed: Oct. 28, 2015

(86) PCT No.: PCT/JP2015/080439
§ 371 (c)(1),
(2) Date: Apr. 12, 2017

(87) PCT Pub. No.: WO2016/080166
PCT Pub. Date: May 26, 2016

(65) Prior Publication Data
US 2017/0225256 A1    Aug. 10, 2017

(30) Foreign Application Priority Data
Nov. 18, 2014 (JP) .................. 2014-233234

(51) Int. Cl.
*B23K 9/00* (2006.01)
*B23K 15/00* (2006.01)
(Continued)

(52) U.S. Cl.
CPC .............. *B23K 9/125* (2013.01); *B23K 9/067* (2013.01); *B23K 9/073* (2013.01); *B23K 9/09* (2013.01);
(Continued)

(58) Field of Classification Search
CPC .......... B23K 9/067; B23K 9/073; B23K 9/09; B23K 9/092; B23K 9/093; B23K 9/124; B23K 9/125
(Continued)

(56) References Cited

U.S. PATENT DOCUMENTS

2004/0074884 A1    4/2004 Butler et al.
2010/0213181 A1*   8/2010 Hirota .................. B23K 9/0671
                                                    219/130.31
(Continued)

FOREIGN PATENT DOCUMENTS

JP         4807479    8/2011
JP         5201266    2/2013
(Continued)

OTHER PUBLICATIONS

Search Report issued in International Bureau of WIPO Patent Application No. PCT/JP2015/080439, dated Jan. 19, 2016.
(Continued)

*Primary Examiner* — Sang Y Paik
(74) *Attorney, Agent, or Firm* — Greenblum & Bernstein, P.L.C.

(57) ABSTRACT

There is provided an arc welding control method for performing a forward/reverse feeding control of alternating a feeding rate of a welding wire between a forward feeding period and a reverse feeding period, and generating short-circuiting periods and arc periods to perform welding. The welding wire is fed forwardly upon starting the welding. The forward feeding is continued during a transient welding period from a time point at which the welding wire comes in contact with a base material and conduction of welding current is started to a time point at which convergence on a steady welding period is performed. The transient welding period is terminated at the short-circuiting period. The
(Continued)

forward/reverse feeding control is started from the reverse feeding period after the termination of the transient welding period.

6 Claims, 2 Drawing Sheets

(51) Int. Cl.
  *B23K 9/12* (2006.01)
  *B23K 9/073* (2006.01)
  *B23K 9/067* (2006.01)
  *B23K 9/09* (2006.01)

(52) U.S. Cl.
  CPC .............. *B23K 9/092* (2013.01); *B23K 9/093* (2013.01); *B23K 9/124* (2013.01)

(58) Field of Classification Search
  USPC ................... 219/136, 137 R, 137 PS, 137.2, 219/137.7–137.71, 121.11–121.14
  See application file for complete search history.

(56) References Cited

U.S. PATENT DOCUMENTS

| | | | |
|---|---|---|---|
| 2012/0097654 A1* | 4/2012 | Kawamoto | B23K 9/073 219/125.1 |
| 2012/0111842 A1 | 5/2012 | Fujiwara et al. | |
| 2012/0199567 A1 | 8/2012 | Nakagawa et al. | |
| 2012/0255940 A1* | 10/2012 | Fujiwara | B23K 9/09 219/137 R |
| 2013/0068744 A1* | 3/2013 | Matsui | B23K 9/092 219/137 R |

FOREIGN PATENT DOCUMENTS

| | | |
|---|---|---|
| JP | 2013-169555 | 9/2013 |
| JP | 2014-140869 | 8/2014 |
| WO | 2012/032703 | 3/2012 |

OTHER PUBLICATIONS

Written Opinion issued in International Bureau of WIPO Counterpart Patent Appl. No. PCT/JP2015/080439 and English langauge translation thereof, dated Jan. 19, 2016.

* cited by examiner

ARC WELDING CONTROL METHOD

TECHNICAL FIELD

The present invention relates to an arc welding control method of performing a forward/reverse feeding control of alternating a feeding rate of a welding wire between a forward feeding period and a reverse feeding period, and generating short-circuiting periods and arc periods to perform welding.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short-circuiting period and an arc period are alternately repeated.

In order to further improve welding quality, there has been proposed a welding method of alternating feeding of the welding wire between forward feeding and reverse feeding cyclically (see Patent Documents 1 and 2, for example).

According to the invention of the patent document 1, an average value of the feeding rate is adjusted according to a welding current setting value, and a repetition frequency and an amplitude of the forward feeding and the reverse feeding of the welding wire are adjusted to respective values according to the welding current setting value.

The invention of the patent document 2 relates to an arc welding control method of feeding the welding wire at a wire feeding rate of cyclically repeating the forward feeding and the reverse feeding with predetermined frequency and amplitude from a time point at which start of the welding is instructed and conduction of welding current is started, and then changing the wire feeding rate to a constant feeding rate.

PRIOR ART DOCUMENT

Patent Document

Patent Document 1: Japanese Patent No. 5201266
Patent Document 2: Japanese Patent No. 4807479

SUMMARY OF INVENTION

Problems to be Solved by Invention

As described above, during a steady welding period, stable welding can be achieved by performing the welding in a manner of alternating the feeding rate between a predetermined forward feeding period and a predetermined reverse feeding period. However, during a transient welding period from start of the welding to convergence on the steady welding period, if the forward/reverse feeding control the same as that in the steady welding period is performed, there arises a problem that a welding state becomes unstable.

Accordingly an object of the present invention is to provide an arc welding control method which, in welding of alternating a feeding rate between a forward feeding period and a reverse feeding period, can stabilize a welding state during a transient welding period from start of the welding to convergence on a steady welding period.

Means for Solving Problems

In order to solve the above-described problem, according to the present invention, there is provided an arc welding control method for performing a forward/reverse feeding control of alternating a feeding rate of a welding wire between a forward feeding period and a reverse feeding period, and generating short-circuiting periods and arc periods to perform welding, the arc welding control method includes: feeding the welding wire forwardly upon starting the welding; continuing the forward feeding during a transient welding period from a time point at which the welding wire comes in contact with a base material and conduction of welding current is started to a time point at which convergence on a steady welding period is performed; terminating the transient welding period at the short-circuiting period; and starting the forward/reverse feeding control from the reverse feeding period after the termination of the transient welding period.

According to the present invention, in the arc welding control method, the transient welding period is defined as a period from the time point at which the conduction of the welding current is started to a time point during the first short-circuiting period after elapsing a predetermined period from the conduction.

According to the present invention, in the arc welding control method, the transient welding period is defined as a period from the time point at which the conduction of the welding current is started to a time point during the first short-circuiting period after terminating a predetermined number of the short-circuiting periods from the conduction.

According to the present invention, in the arc welding control method, the transient welding period is defined as a period from the time point at which the conduction of the welding current is started to a time point during the first short-circuiting period after the welding torch starts moving.

Advantageous Effects of Invention

According to the present invention, by feeding the welding wire forwardly during the transient welding period, a molten pool can be formed in a stable state. If the molten pool is formed, as the forward/reverse feeding control is started from the reverse feeding period during the short-circuiting period, shifting to the steady welding period can be performed smoothly.

EMBODIMENTS OF INVENTION

Hereinafter an embodiment according to the present invention will be explained with reference to drawings.

[First Embodiment]

Figure 1:
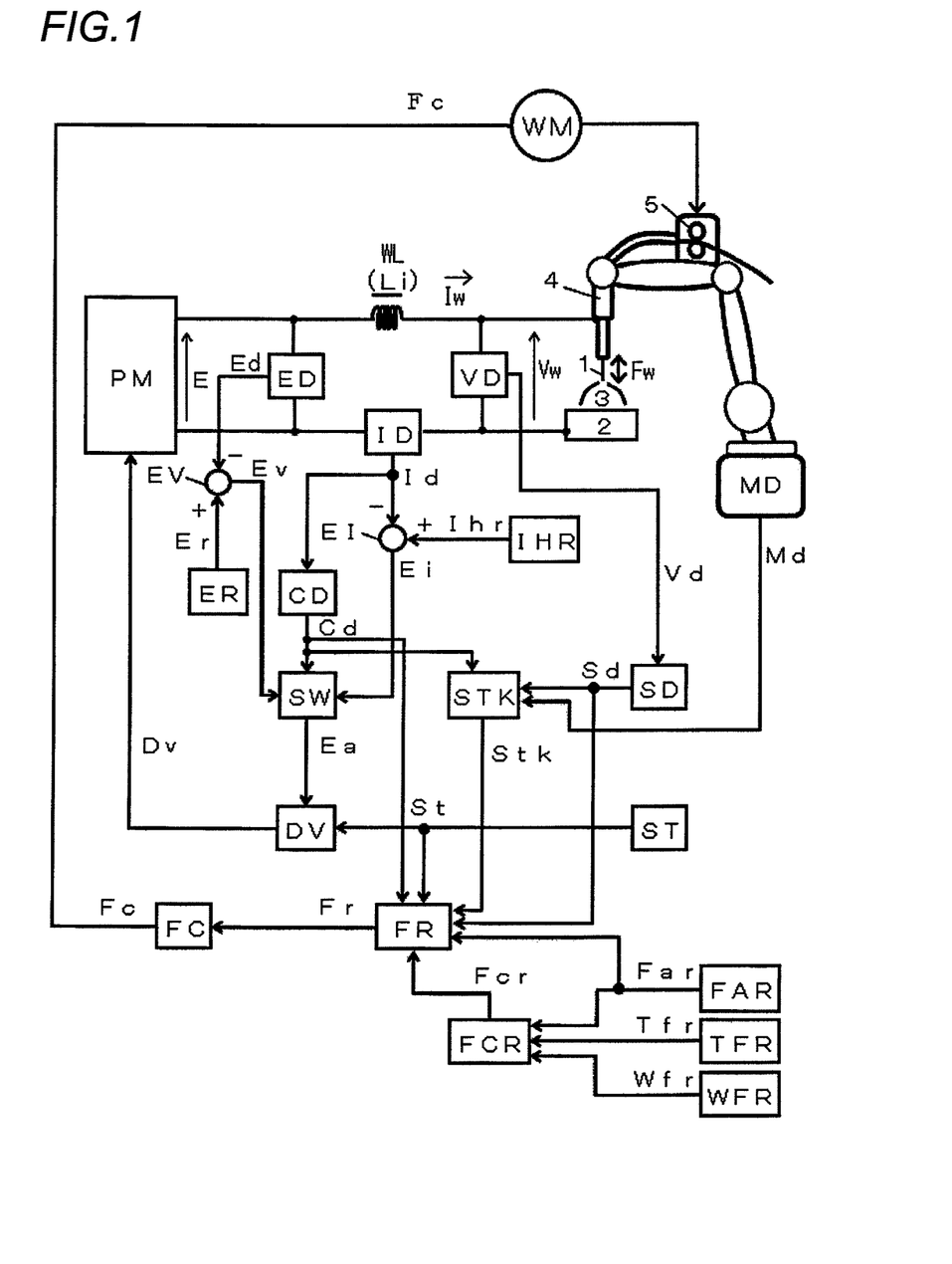
FIG. 1 A block diagram illustrating a welding power supply for implementing an arc welding control method according to a first embodiment of the present invention.

FIG. 1 is a block diagram illustrating a welding power supply for implementing an arc welding control method according to a first embodiment of the present invention. Hereinafter individual blocks will be explained with reference to this figure.

Using power of three-phase 200V or the like from a commercial power supply (not shown) as input, a power supply main circuit PM subjects the input power to an output control such as an inverter control according to a drive signal Dv described later, and outputs an output voltage E. Although not shown in the figure, this power supply main circuit PM includes a primary rectifier for rectifying the commercial power supply, a smoothing capacitor for smoothing the rectified DC, an inverter circuit which is driven by the drive signal Dv and converts the smoothed DC into a high-frequency AC, a high-frequency transformer for stepping down the high-frequency AC to a voltage value suitable for welding, and a secondary rectifier for rectifying the stepped-down high-frequency AC to a DC.

A reactor WL smooths the output voltage E. An inductance value of the reactor WL is, for example, 200 µH.

Using a feed control signal Fc described later as input, a feeding motor WM feeds a welding wire 1 at a feeding rate Fw in a manner of alternating forward feeding and reverse feeding cyclically. A motor having high transient responsiveness is used as the feeding motor WM. In some cases, the feeding motor WM is installed near a tip of a welding torch 4 in order to increase a changing rate of the feeding rate Fw and an inversion speed of the feeding direction of the welding wire 1. Further in some cases, a push-pull feeding system is employed by using two feeding motors WM.

The welding wire 1 is fed within the welding torch 4 in accordance with rotation of a feeding roll 5 coupled to the feeding motor WM, and thus an arc 3 is generated between the welding wire and base material 2. A welding voltage Vw is applied between a power supply tip (not shown) within the welding torch 4 and the base material 2, and thus a welding current Iw flows.

A welding torch moving device MD mounts and moves the welding torch 4, and outputs a welding torch moving signal Md which becomes a high level during movement of the welding torch and becomes a low level during stopping thereof. The welding torch moving device MD is a robot unit, an automatic carriage or the like.

An output voltage setting circuit ER outputs an output voltage setting signal Er set in advance. An output voltage detection circuit ED detects and smooths the output voltage E, thereby outputting an output voltage detection signal Ed.

Using the output voltage setting signal Er and the output voltage detection signal Ed as input, a voltage error amplifying circuit EV amplifies an error between the output voltage setting signal Er (+) and the output voltage detection signal Ed (−) and outputs a voltage error amplified signal Ev. This voltage error amplifier circuit EV subjects the welding power supply to constant voltage control.

A hot-start current setting circuit IHR outputs a hot-start current setting signal Ihr set in advance. A current detection circuit ID detects the welding current Iw and outputs a current detection signal Id.

Using the hot-start current setting signal Ihr and the current detection signal Id as input, a current error amplifying circuit EI amplifies an error between the hot-start current setting signal Ihr (+) and the current detection signal Id (−) and outputs a current error amplified signal Ei. This circuit subjects the welding power supply to a constant current control during a period (hot-start period) in which hot-start current flows.

Using the current detection signal Id as input, a current-conduction discrimination circuit CD discriminates that the welding current Iw flows when a value of the current detection signal is a threshold value (about 10V) or more and outputs a current-conduction discrimination signal Cd of a high level.

Using the current error amplified signal Ei, the voltage error amplified signal Ev and the current-conduction discrimination signal Cd as input, a power-supply characteristic switching circuit SW outputs the current error amplified signal Ei as an error amplified signal Ea during a predetermined hot-start period from a time point where the current-conduction discrimination signal Cd changes to the high level (current conduction), whilst outputs the voltage error amplified signal Ev as the error amplified signal Ea during the other period.

A voltage detection circuit VD detects the welding voltage Vw and outputs a voltage detection signal Vd. Using the voltage detection signal Vd as input, a short-circuit discrimination circuit SD outputs a short-circuit discrimination signal Sd. In a case where a value of the voltage detection signal is smaller than a short-circuit discrimination value (about 10V), the discrimination circuit determines to be a short-circuiting period and outputs the discrimination signal of a high level. In a case where a value of the voltage detection signal is the short-circuit discrimination value or more, the discrimination circuit determines to be an arc period and outputs the discrimination signal of a low level.

A welding start circuit ST outputs a welding start signal St which becomes a high level when the welding power supply is activated. This welding start circuit ST corresponds to a start switch of the welding torch 4, a PLC for controlling a welding process, a robot control device or the like.

Using the error amplified signal Ea and the welding start signal St as input, a driving circuit DV performs a PWM modulation control based on the error amplified signal Ea when the welding start signal St is at the high level (welding start), and outputs the drive signal Dv for driving the inverter circuit within the power supply main circuit PM.

Using the current-conduction discrimination signal Cd, the short-circuit discrimination signal Sd and the welding torch moving signal Md as input, a transient welding-period timer circuit STK selectively performs one of the following processing 1) to 3) and outputs a transient welding-period timer signal Stk.

1) Outputting the transient welding-period timer signal Stk which is set to a high level at a time point where the current-conduction discrimination signal Cd changes to the high level (current conduction), and reset to a low level at a time point where a predetermined period elapses from the setting.

2) Outputting the transient welding-period timer signal Stk which is set to the high level at the time point where the current-conduction discrimination signal Cd changes to the high level (current conduction), and reset to the low level at a time point where a predetermined number of the high-level (short circuit) periods of the short-circuit discrimination signal Sd terminates after the setting.

3) Outputting the transient welding-period timer signal Stk which is set to the high level at the time point where the current-conduction discrimination signal Cd changes to the high level (current conduction), and reset to the low level at a time point where the welding torch moving signal Md changes to the high level (moving) after the setting.

An average feeding-rate setting circuit FAR outputs an average feeding-rate setting signal Far set in advance. A cycle setting circuit TFR outputs a cycle setting signal Tfr set in advance. An amplitude setting circuit WFR outputs an amplitude setting signal Wfr set in advance.

Using the average feeding-rate setting signal Far, the cycle setting signal Tfr and the amplitude setting signal Wfr as input, a steady welding-period feeding-rate setting circuit FCR outputs a steady welding-period feeding-rate setting signal Fcr. The steady welding-period feeding-rate setting signal has a waveform that is configured by shifting a predetermined trapezoidal wave, having a cycle Tf determined by the cycle setting signal Tfr and an amplitude Wf determined by the amplitude setting signal Wfr and changing symmetrically in positive and negative sides, to a forward-feeding side by an amount of the average feeding-rate setting signal Far. This steady welding-period feeding-rate setting signal Fcr will be described in detail later with reference to FIG. 2.

Using the average feeding-rate setting signal Far, the steady welding-period feeding-rate setting signal Fcr, the welding start signal St, the current-conduction discrimination signal Cd, the transient welding-period timer signal Stk and the short-circuit discrimination signal Sd as input, a feeding-rate setting circuit FR performs the following processing and outputs a feeding-rate setting signal Fr.

1) When the welding start signal St becomes the high level (welding start), outputting the feeding-rate setting signal Fr which is switched from 0 to a predetermined slow-down feeding rate. Feeding of the welding wire 1 is stopped in a case of Fr=0.

2) When the current conduction discrimination signal Cd becomes the high level (current conduction), outputting the feeding-rate setting signal Fr which accelerates from the slow-down feeding rate during a predetermined acceleration period and, when reaching the average feeding-rate setting signal Far, maintains a value of this setting signal.

3) When the short-circuit discrimination signal Sd becomes the high level (short circuit) after the transient welding-period timer signal Stk changes the low level, outputting the steady welding-period feeding-rate setting signal Fcr starting from a reverse feeding period as the feeding-rate setting signal Fr. The acceleration period is a period equal to or shorter than the high-level period of the transient welding-period timer signal Stk. A transient welding period Tk is a period from a time point at which the current conduction discrimination signal Cd changes to the high level to a time point at which the short-circuit discrimination signal Sd changes to the high level after the transient welding-period timer signal Stk changes to the low level.

Using the feeding-rate setting signal Fr as input, a feeding control circuit FC outputs, to the feeding motor WM, the feeding control signal Fc for feeding the welding wire 1 at the feeding rate Fw corresponding to a value of the feeding-rate setting signal Fr.

Figure 2:
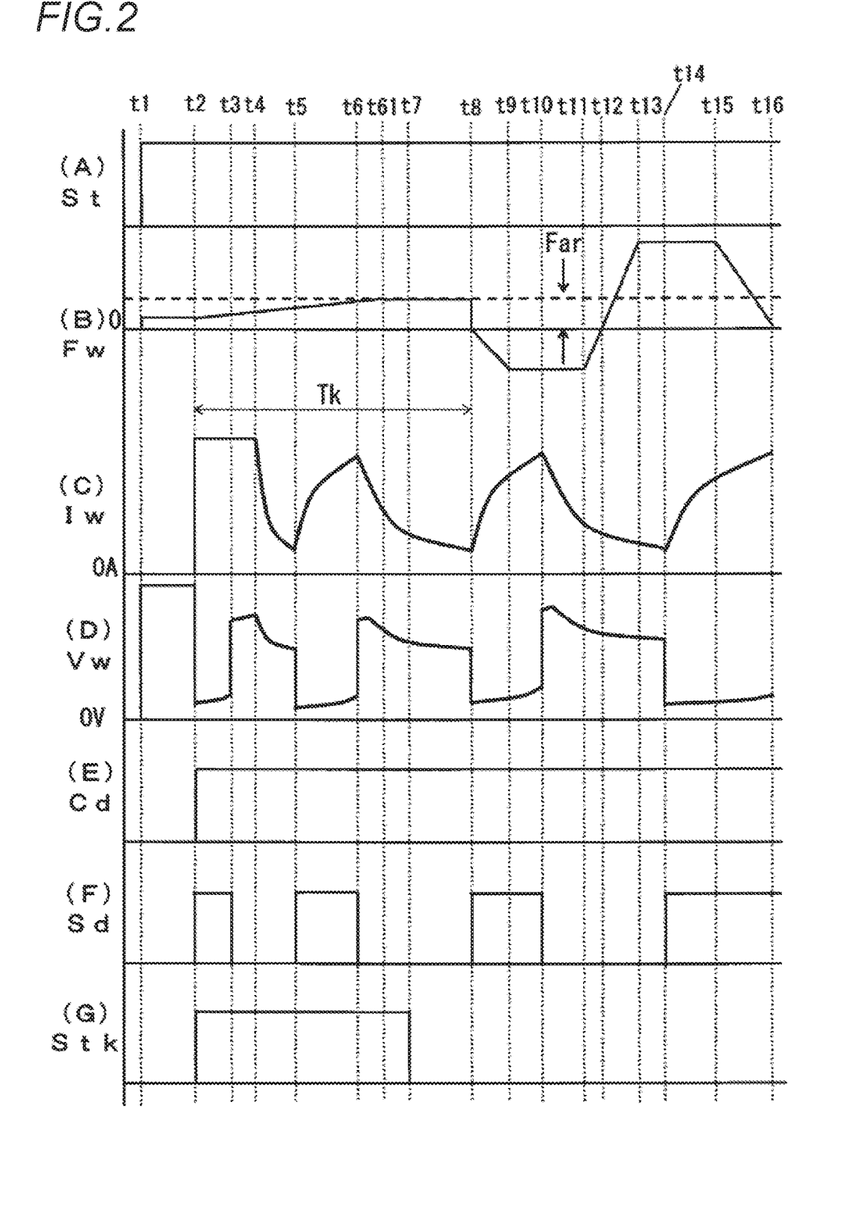
FIG. 2 A timing chart illustrating individual signals upon starting welding in the welding power supply of FIG. 1, showing the arc welding control method according to the first embodiment of the present invention.

FIG. 2 is a timing chart which illustrates individual signals upon starting the welding in the welding power supply of FIG. 1, and shows the arc welding control method according to the first embodiment of the present invention. (A) of this figure shows temporal change of the welding start signal St, (B) of this figure shows temporal change of the feeding rate Fw (C) of this figure shows temporal change of the welding current Iw, (D) of this figure shows temporal change of the welding voltage Vw, (E) of this figure shows temporal change of the current-conduction discrimination signal Cd, (F) of this figure shows temporal change of the short-circuit discrimination signal Sd, and (G) of this figure shows temporal change of the transient welding-period timer signal Stk. Hereinafter operations of the individual signals upon starting the welding will be explained with reference to this figure.

As shown in (B) of this figure, in the feeding rate Fw, an upper side and a lower side than 0 represent a forward feeding period and the reverse feeding period, respectively. The forward feeding represents feeding of the welding wire 1 in a direction approaching the base material 2, whilst the reverse feeding represents feeding of the welding wire in a direction leaving from the base material 2. The feeding rate Fw during a steady welding period has a waveform which changes in a trapezoidal shape and shifts on the forward feeding side. Thus, as an average value of the feeding rate Fw is positive, the welding wire 1 is fed forwardly in average.

The feeding rate Fw shown in (B) of this figure is controlled to a value of the feeding-rate setting signal Fr outputted from the feeding-rate setting circuit FR of FIG. 1. The feeding-rate setting signal Fr during the steady welding period has a waveform that is configured by shifting a predetermined trapezoidal wave, having a cycle Tf determined by the cycle setting signal Tfr and an amplitude Wf determined by the amplitude setting signal Wfr and changing symmetrically in positive and negative sides, to the forward-feeding side by a value of the average feeding-rate setting signal Far. Thus, as shown in (B) of this figure, the feeding rate Fw during the steady welding period has a feeding rate pattern of the predetermined trapezoidal wave that has the amplitude Wf and the cycle Tf and is symmetrical with respect to an average feeding rate Fa shown by a broken line as a reference line determined by the average feeding-rate setting signal Far. That is, the amplitudes on the upper and lower sides with respect to the reference line are the same. Also the periods on the upper and lower sides with respect to the reference line are the same.

When viewing the trapezoidal wave of the feeding rate Fw during the steady welding period with respect to 0 as a reference line, as shown in (B) of this figure, a reverse feeding period of the steady welding period from a time point t8 to a time point t12 is formed by a predetermined reverse-feeding acceleration period of the steady welding period, a predetermined reverse-feeding peak period of the steady welding period, a predetermined reverse-feeding peak value of the steady welding period and a predetermined reverse-feeding deceleration period of the steady welding period. A forward feeding period of the steady welding period from the time point t12 to a time point t16 is formed by a predetermined forward-feeding acceleration period of the steady welding period, a predetermined forward-feeding peak period of the steady welding period, a predetermined forward-feeding peak value of the steady welding period and a predetermined forward-feeding deceleration period of the steady welding period.

When the welding start signal St changes to the high level (welding start) at a time point t1, as shown in (B) of this figure, the feeding rate Fw changes from 0 to the predetermined slow-down feeding rate of a positive value, and thus the welding wire 1 is fed forwardly. This slow-down feeding rate is set to a small value of about 1 m/min. Simultaneously, as the welding power supply is activated at the time point t1, as shown in (D) of this figure, the welding voltage Vw becomes a no-load voltage value of the maximum output voltage value.

When the welding wire 1 comes in contact (short-circuited) with the base material 2 according to the forward feeding at a time point t2, as shown in (D) of this figure, the welding voltage Vw rapidly reduces to a short-circuit voltage value of several volts. As the welding voltage Vw reduces to a value smaller than the predetermined short-circuit discrimination value (about 10V), as shown in (F) of this figure, the short-circuit discrimination signal Sd changes to the high level (short circuit). Simultaneously, at the time point t2, as shown in (C) of this figure, the welding current Iw of a predetermined hot-start current value (about 200 to 500 A) starts flowing. Further, as shown in (E) of this figure, the current-conduction discrimination signal Cd changes to the high level (current conduction). In response to this change, as shown in (G) of this figure, the transient welding-period timer signal Stk changes to the high level, and returns to the low level at a time point t7 as described later. As described later, a period from the time point t2 to the time point t8, that is, a period until the first short circuit occurs after the transient welding-period timer signal Stk changes to the low level corresponds to the transient welding period Tk. The hot-start current flows during the predetermined hot-start period from the time point t2 to a time point t4.

As shown in (B) of this figure, the feeding rate Fw accelerates during the predetermined acceleration period from the time point t2, then reaches a value of the average feeding-rate setting signal Far at a time point t61 and maintains this value until the time point t8 at which the transient welding period Tk terminates.

When an arc 3 is generated at a time point t3 due to the conduction of the hot-start current, as shown in (D) of this figure, the welding voltage Vw rapidly increases to an arc voltage value of several tens of volts. In response to this increase, as shown in (F) of this figure, the short-circuit discrimination signal Sd changes to the low level (arc). When the hot-start period terminates at the time point t4 during the arc period starting from the time point t3, as shown in (C) of this figure, the welding current Iw reduces from the hot-start current to a current determined according to an arc load.

When short circuit occurs at a time point t5, as shown in (D) of this figure, the welding voltage Vw rapidly reduces to the short-circuit voltage value of several volts. In response to this reduction, as shown in (F) of this figure, the short-circuit discrimination signal Sd changes to the high level (short circuit). As shown in (C) of this figure, the welding current Iw gradually increases during the short-circuiting period.

When an arc is generated at a time point t6, the welding voltage Vw rapidly increases to the arc voltage value of several tens of volts as shown in (D) of this figure. In response to this increase, the short-circuit discrimination signal Sd changes to the low level (arc) as shown in (F) of this figure. As shown in (C) of this figure, the welding current Iw gradually reduces during the arc period from the time point t6 to the time point t8.

As shown in (G) of this figure, the transient welding-period timer signal Stk changes to the low level at the time point t7. As described above, the timing at which the transient welding-period timer signal Stk changes to the low level corresponds to the time point t7 at which the predetermined period elapses from the time point t2 where the current conduction discrimination signal Cd changes to the high level (current conduction). The timing at which the transient welding-period timer signal Stk changes to the low level may be set to a time point at which the predetermined number of the high-level (short-circuiting) periods terminates. Alternatively, the timing at which the transient welding-period timer signal Stk changes to the low level may be set to a time point at which the welding torch moving signal Md changes to the high level (moving).

The first short circuit after the transient welding-period timer signal Stk changes to the low level at the time point t7 occurs at the time point t8. The period from the time point t2 to the time point t8 corresponds to the transient welding period Tk. The termination timing of the transient welding period Tk may be set to a time point during the short-circuiting period at which a predetermined delay period elapses from the occurrence of short circuit at the time point t8. This delay period is a period until a short circuiting state becomes stable and set to about 0.5 to 3 ms.

The transient welding period Tk is set as a period until a molten pool having almost the same size as that in the steady welding period is formed. It is determined that a molten pool of almost the same size as a molten pool formed during the steady welding period has been formed, from a fact that the predetermined period elapses after starting the conduction of the welding current Iw, that the predetermined number of the short-circuiting periods terminates, or that the welding torch starts moving. The transient welding period Tk is in a range almost from 50 to 1,000 ms. Although this figure shows a case where short circuit occurs twice during the transient welding period Tk, short circuit actually occurs 5 to 100 times during this period.

When the transient welding period Tk terminates and the steady welding period starts at the time point t8, a forward/reverse feeding control of the welding wire 1 is started.

[Operation During First Reverse Feeding Period of Steady Welding Period from Time Point t8 to Time Point t12]

As shown in (B) of this figure, at the time point t8, the feeding rate Fw is switched from a forward feeding state at the average feeding rate Fa to a reverse feeding state. During a period from the time point t8 to a time point t9, the feeding rate enters in the reverse-feeding acceleration period of the steady welding period and accelerates from 0 to the reverse-feeding peak value of the steady welding period. As this period is in the short-circuiting period, the short-circuit discrimination signal Sd is at the high level (short circuit) as shown in (F) of this figure.

When the reverse-feeding acceleration period of the steady welding period terminates at the time point t9, as shown in (B) of this figure, the feeding rate Fw enters into the reverse-feeding peak period of the steady welding period from the time point t9 to a time point t11 and reaches the reverse-feeding peak value of the steady welding period. At a time point t10 during this period, an arc 3 is generated again due to the reverse feeding and a pinch force caused by the conduction of the welding current Iw. In response to the arc regeneration, the welding voltage Vw rapidly increases to the arc voltage value of several tens of volts as shown in (D) of this figure, whilst the short-circuit discrimination signal Sd changes to the low level (arc) as shown in (F) of this figure. As shown in (C) of this figure, the welding current Iw gradually reduces from the arc regeneration.

When the reverse-feeding peak period of the steady welding period terminates at the time point t11, as shown in (B) of this figure, the feeding rate enters into the reverse-feeding deceleration period of the steady welding period from the time point t11 to the time point t12 and reduces to 0 from the reverse-feeding peak value of the steady welding period.

[Operation During First Forward Feeding Period of Steady Welding Period from Time Point t12 to Time Point t16]

As shown in (B) of this figure, the feeding rate Fw enters into the forward-feeding acceleration period of the steady welding period from the time point t12 to a time point t13 and accelerates from 0 to the forward-feeding peak value of the steady welding period. The arc period is maintained during this period.

When the forward-feeding acceleration period of the steady welding period terminates at the time point t13, as shown in (B) of this figure, the feeding rate Fw enters into the forward-feeding peak period of the steady welding period from the time point t13 to a time point t15 and reaches the forward-feeding peak value of the steady welding period. At a time point t14 during this period, short circuit occurs due to the forward feeding. In response to the short circuit, the welding voltage Vw rapidly reduces to the short circuit voltage value of several volts as shown in (D) of this figure, whilst the short-circuit discrimination signal Sd changes to the high level (short circuit) as shown in (F) of this figure. As shown in (C) of this figure, the welding current Iw gradually increases from the occurrence of short circuit.

When the forward-feeding peak period of the steady welding period terminates at the time point t15, as shown in (B) of this figure, the feeding rate enters into the forward-feeding deceleration period of the steady welding period from the time point t15 to the time point t16 and reduces to 0 from the forward-feeding peak value of the steady welding period.

During the steady welding period after this forward-feeding deceleration period, the operations of the reverse-feeding period of the steady welding period and the forward-feeding period of the steady welding period are alternatively repeated. As described above, when entering into the steady welding period, short circuit occurs during the forward-feeding peak period of the steady welding period and an arc is generated during the reverse-feeding peak period of the steady welding period. As a result, a cycle of the short-circuiting period and the arc period is placed in a synchronous state with a cycle of the forward feeding period and the reverse feeding period of the feeding rate Fw. In other words, as the cycle of the short-circuiting period and the arc period can be controlled to a desired value by setting the cycle Tf of the feeding rate Fw, the welding can be performed stably.

An example of numerical values of the trapezoidal wave of the feeding rate Fw during the steady welding period will be shown below. When the trapezoidal wave is set to have a cycle Tf of 10 ms, an amplitude Wf of 60 m/min, an average feeding rate Fa of 5 m/min, each half-cycle inclination period of 1.2 ms, a peak period of 2.6 ms and a peak value of 30 m/min, the feeding rate is configured to have a waveform obtained by shifting this trapezoidal wave to the forward-feeding side by the average feeding rate Fa of 5 m/min. An average welding current is about 250 A. Waveform parameters in this case are as follows. The reverse feeding period of the steady welding period is 4.6 ms, the reverse-feeding acceleration period of the steady welding period is 1.0 ms, the reverse-feeding peak period of the steady welding period is 2.6 ms, the reverse-feeding peak value of the steady welding period is −25 m/min, the reverse-feeding deceleration period of the steady welding period is 1.0 ms, the forward feeding period of the steady welding period is 5.4 ms, the forward-feeding acceleration period of the steady welding period is 1.4 ms, the forward-feeding peak period of the steady welding period is 2.6 ms, the forward-feeding peak value of the steady welding period is 35 m/min and the forward-feeding deceleration period of the steady welding period is 1.4 ms.

Although the explanation is made as to the case where the feeding rate Fw has the trapezoidal wave, the waveform of the feeding rate is not limited thereto. The feeding rate is merely required to have a waveform such as a sine wave or a triangular wave that changes cyclically.

According to the first embodiment, during the transient welding period until convergence on the steady welding period, the feeding rate is placed in the forward feeding state like the normal welding. In contrast, during the steady welding period, the forward/reverse feeding control of alternating the predetermined forward feeding period and the predetermined reverse feeding period is performed. During the transient welding period where a molten pool is not formed sufficiently, if the predetermined forward feeding period and the predetermined reverse feeding period are alternately repeated like the steady welding period, the welding state is apt to be unstable. In this embodiment, therefore, the feeding rate is placed in the forward feeding state during the transient welding period until a molten pool is formed, and then the feeding control is switched to the forward/reverse feeding control after the molten pool is formed, whereby the welding state during the transient welding period upon starting the welding can be stabilized.

According to the first embodiment, the feeding control is switched from the transient welding period to the steady welding period, by starting the forward/reverse feeding control from the reverse feeding period during the short-circuiting period. If the forward/reverse feeding control is started during the arc period, the welding state is apt to be unstable. Thus, in this embodiment, the switching can be performed smoothly by starting the forward/reverse feeding control from the reverse feeding period during the short-circuiting period.

According to the first embodiment described above, the welding wire is fed forwardly upon starting the welding, then the forward feeding is continued during the transient welding period from the time point where the welding wire comes in contact with the base material and conduction of the welding current is started to the time point at which the convergence on the steady welding period is performed, then the transient welding period is terminated at the short-circuiting period, and the forward/reverse feeding control is started from the reverse feeding period after the termination of the transient welding period. Thus, in this embodiment, by feeding the welding wire forwardly during the transient welding period, the molten pool can be formed in a stable state. If the molten pool is formed, as the forward/reverse feeding control is started from the reverse feeding period during the short-circuiting period, shifting to the steady welding period can be performed smoothly.

INDUSTRIAL APPLICABILITY

According to the present invention, in the welding of alternating the feeding rate between the forward feeding period and the reverse feeding period, the welding state can be stabilized during the transient welding period from the start of the welding to the convergence on the steady welding period.

Although the present invention is explained with reference to the particular embodiment, the present invention is not limited thereto but the embodiment may be changed in various manners within a range not departing from the technical concept disclosed in the present invention.

This application is based on Japanese Patent Application (Japanese Patent Application No. 2014-233234) filed on Nov. 18, 2014, the content of which is incorporated herein by reference.

DESCRIPTION OF REFERENCE NUMERALS 1 welding wire
2 base material 3 arc
4 welding torch
5 feeding roll
CD current-conduction discrimination circuit
Cd current-conduction discrimination signal
DV driving circuit
Dv drive signal
E output voltage
Ea voltage error amplified signal
ED output voltage detection circuit
Ed output voltage detection signal
EI current error amplifying circuit
Ei current error amplified signal
ER output voltage setting circuit
Er output voltage setting signal
EV voltage error amplifying circuit
Ev voltage error amplified signal
Fa average feeding rate
FAR average feeding-rate setting circuit
Far average feeding-rate setting signal
FC feeding control circuit
Fc feeding control signal
FCR steady welding-period feeding-rate setting circuit
Fcr steady welding-period feeding-rate setting signal
FR feeding-rate setting circuit
Fr feeding-rate setting signal
Fw feeding rate
ID current detection circuit
Id current detection signal
IHR hot-start current setting circuit
Ihr hot-start current setting signal
Iw welding current
MD welding torch moving device
Md welding torch moving signal
PM power supply main circuit
SD short-circuit discrimination circuit
Sd short-circuit discrimination signal
ST welding start circuit
St welding start signal
STK transient welding-period timer circuit
Stk transient welding-period timer signal
SW power-supply characteristic switching circuit
TF cycle
TFR cycle setting circuit
Tfr cycle setting signal
Tk transient welding period
VD voltage detection circuit
Vd voltage detection signal
Vw welding voltage
Wf amplitude
WFR amplitude setting circuit
Wfr amplitude setting signal
WL reactor
WM feeding motor

The invention claimed is:

1. An arc welding control method for performing a forward/reverse feeding control of alternating a feeding rate of a welding wire between a forward feeding period and a reverse feeding period, and generating short-circuiting periods and arc periods to perform welding, the arc welding control method comprising:
feeding the welding wire forwardly upon starting the welding;
continuing the forward feeding during a transient welding period from a time point at which the welding wire comes in contact with a base material and conduction of welding current is started to a time point at which convergence on a steady welding period is performed;
terminating the transient welding period at the short-circuiting period; and
starting the forward/reverse feeding control from the reverse feeding period after the termination of the transient welding period, wherein the transient welding period is defined as a period from the time point at which the conduction of the welding current is started to a time point during the first short-circuiting period after elapsing a predetermined period from the conduction.

2. The arc welding control method according to claim 1, further comprising the short-circuiting period occurring after a transient welding-period timer signal changes from a high level to a low level.

3. An arc welding control method for performing a forward/reverse feeding control of alternating a feeding rate of a welding wire between a forward feeding period and a reverse feeding period, and generating short-circuiting periods and arc periods to perform welding, the arc welding control method comprising:
feeding the welding wire forwardly upon starting the welding;
continuing the forward feeding during a transient welding period from a time point at which the welding wire comes in contact with a base material and conduction of welding current is started to a time point at which convergence on a steady welding period is performed;
terminating the transient welding period at the short-circuiting period; and
starting the forward/reverse feeding control from the reverse feeding period after the termination of the transient welding period, wherein the transient welding period is defined as a period from the time point at which the conduction of the welding current is started to a time point during the first short-circuiting period after terminating a predetermined number of the short-circuiting periods from the conduction.

4. The arc welding control method according to claim 3, further comprising the short-circuiting period occurring after a transient welding-period timer signal changes from a high level to a low level.

5. An arc welding control method for performing a forward/reverse feeding control of alternating a feeding rate of a welding wire between a forward feeding period and a reverse feeding period, and generating short-circuiting periods and arc periods to perform welding, the arc welding control method comprising:
feeding the welding wire forwardly upon starting the welding;
continuing the forward feeding during a transient welding period from a time point at which the welding wire comes in contact with a base material and conduction of welding current is started to a time point at which convergence on a steady welding period is performed;
terminating the transient welding period at the short-circuiting period; and
starting the forward/reverse feeding control from the reverse feeding period after the termination of the transient welding period, wherein the transient welding period is defined as a period from the time point at which the conduction of the welding current is started to a time point during the first short-circuiting period after the welding torch starts moving.

6. The arc welding control method according to claim 5, further comprising the short-circuiting period occurring after a transient welding-period timer signal changes from a high level to a low level.

\* \* \* \* \*